United States Patent
Hayashi

(10) Patent No.: US 8,044,658 B2
(45) Date of Patent: Oct. 25, 2011

(54) POSITION DETECTOR

(75) Inventor: Yoshinori Hayashi, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 593 days.

(21) Appl. No.: 12/182,424

(22) Filed: Jul. 30, 2008

(65) Prior Publication Data
US 2009/0033317 A1    Feb. 5, 2009

(30) Foreign Application Priority Data

Jul. 30, 2007 (JP) .................. 2007-197593
Jul. 18, 2008 (JP) .................. 2008-186888

(51) Int. Cl.
*G01B 7/14* (2006.01)
*G01N 27/72* (2006.01)

(52) U.S. Cl. ......... 324/207.24; 324/207.23; 324/207.25; 324/220

(58) Field of Classification Search .............. None
See application file for complete search history.

(56) References Cited

U.S. PATENT DOCUMENTS

| 6,147,487 A * | 11/2000 | Sugitani ............. 324/207.21 |
| 6,504,363 B1 * | 1/2003 | Dogaru et al. ......... 324/235 |
| 2007/0002488 A1 | 1/2007 | Kato |
| 2007/0193849 A1 | 8/2007 | Kato |

FOREIGN PATENT DOCUMENTS

| JP | 62180216 | 8/1987 |
| JP | 6-53915 | 7/1994 |
| JP | 6-84893 | 10/1994 |
| JP | 11148842 | 6/1999 |
| JP | 2005-195367 | 7/2005 |
| JP | 2006-332074 | 12/2006 |
| JP | 2007-227055 | 6/2007 |

* cited by examiner

*Primary Examiner* — Jermele M Hollington
*Assistant Examiner* — Trung Nguyen
(74) *Attorney, Agent, or Firm* — Morrison & Foerster LLP

(57) ABSTRACT

In a position detecting apparatus, a magnetic scale part has a magnetic pattern formed by magnetization along a longitudinal direction. An increased magnetization part is arranged at an end portion of the magnetic scale part in the longitudinal direction. The increased magnetization part is magnetized with an increased intensity of magnetization as compared to the magnetic scale part. A magnetic field shaping part is disposed adjacent to the magnetic scale part for shaping a magnetic field generated from the magnetic scale part. A magnetic detection part detects both the magnetic field from the magnetic pattern of the magnetic scale part and the magnetic field from the increased magnetization part. The magnetic detection part is arranged in opposed relation to the magnetic scale part movably in the longitudinal direction of the magnetic scale part. The magnetic pattern and the increased magnetization part are arranged along a track through which the magnetic detection part moves.

12 Claims, 9 Drawing Sheets

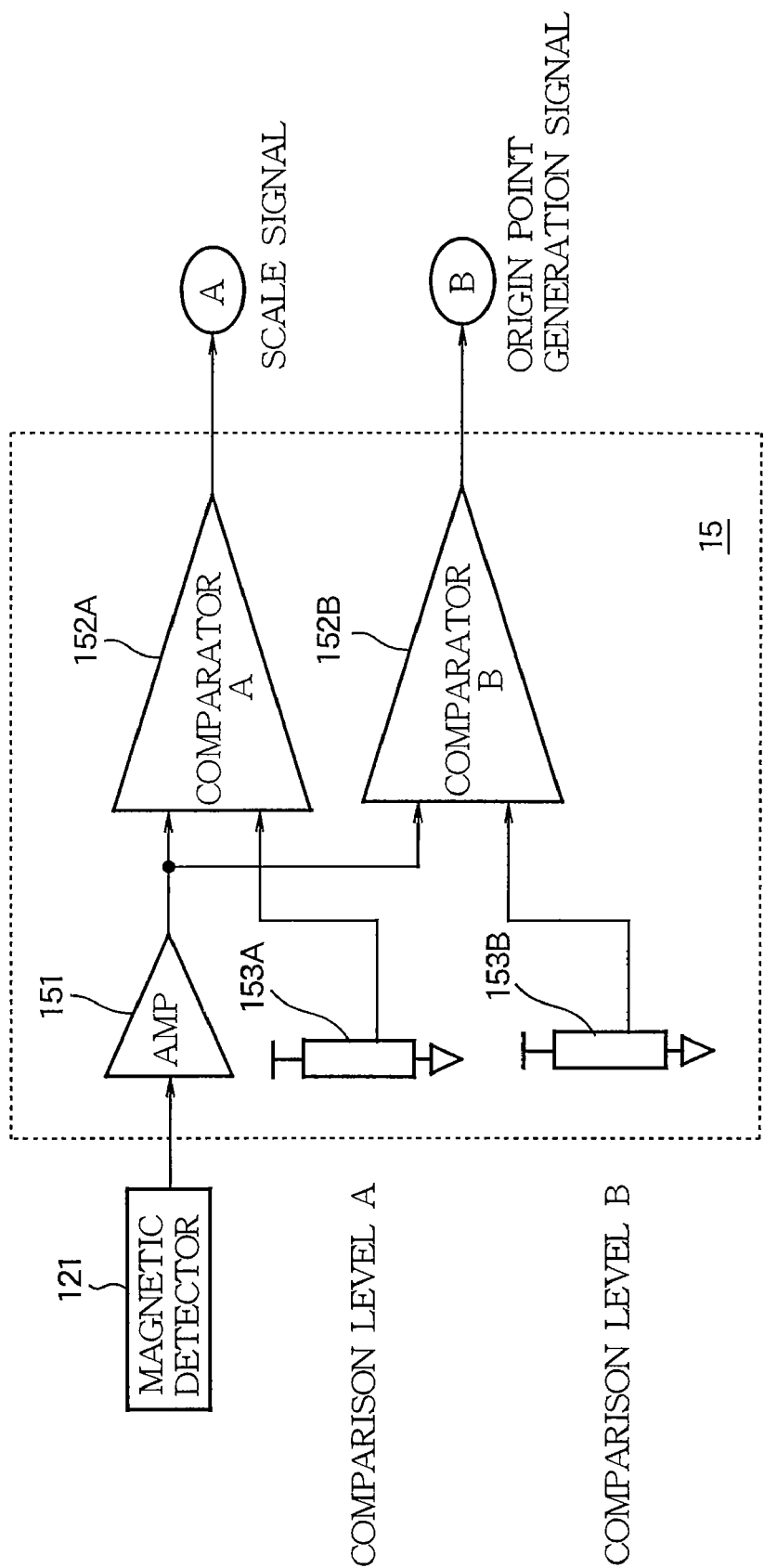

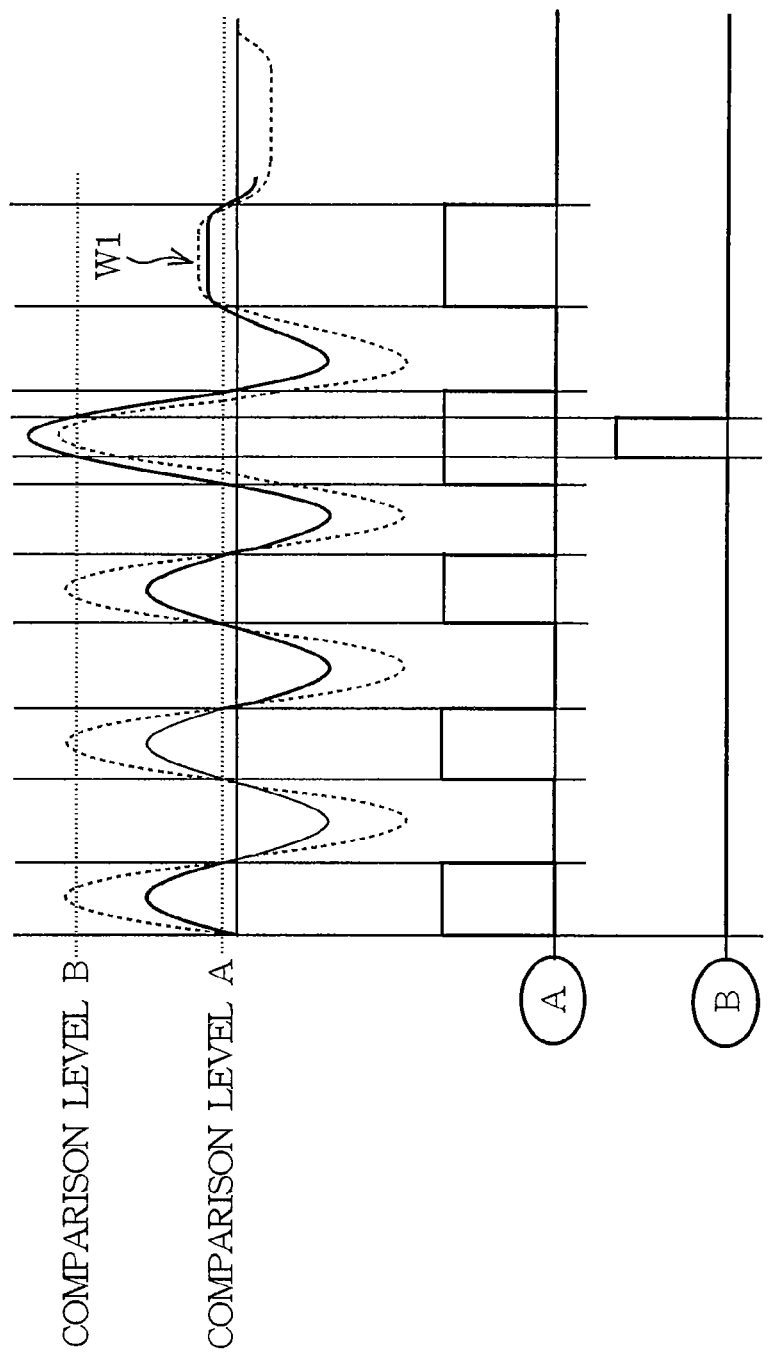

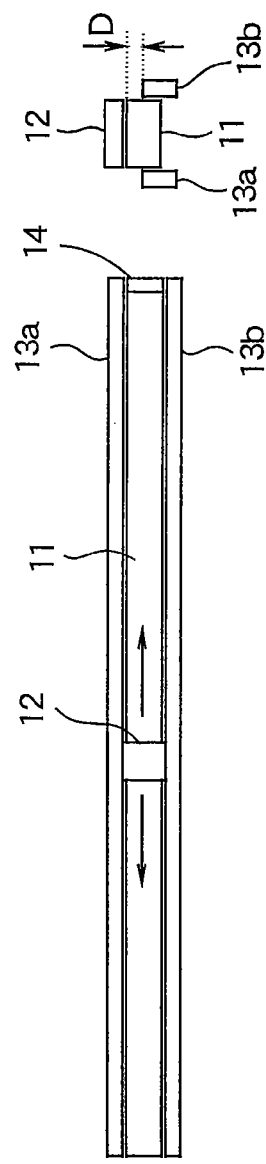
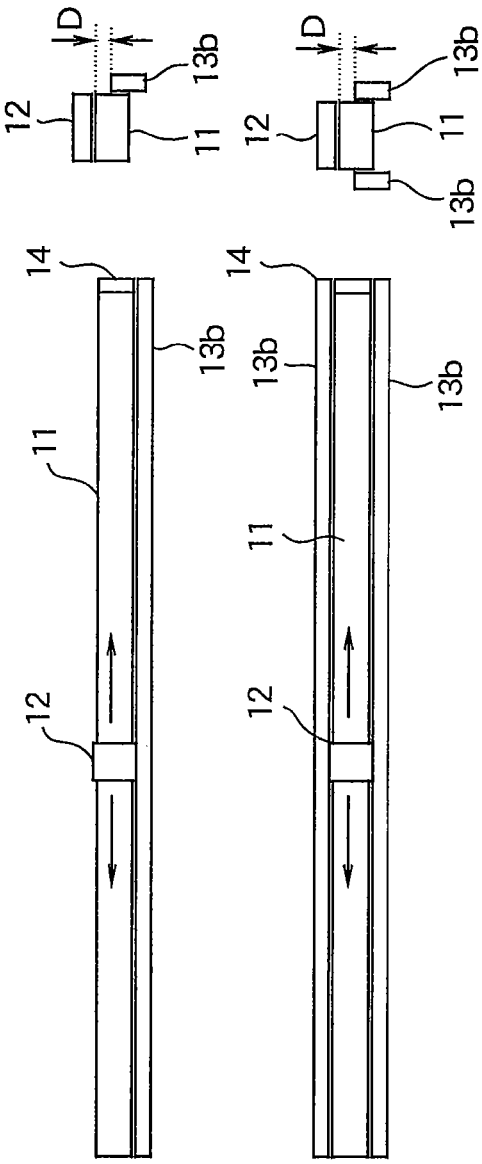
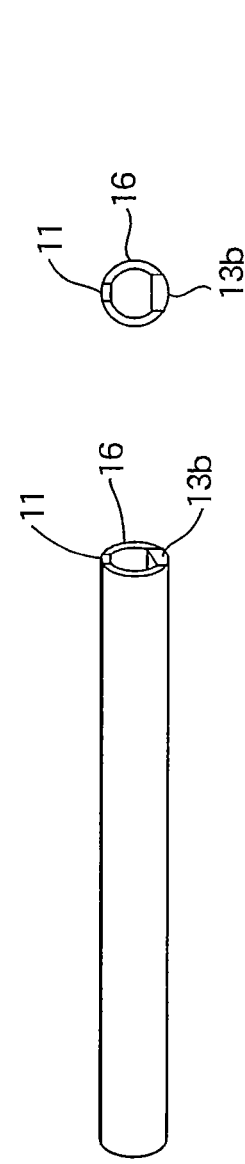
FIG.7A  FIG.7B  FIG.7C  FIG.7D

MR SHAPE-ANISOTROPY DIRECTION

POSITION DETECTOR

BACKGROUND OF THE INVENTION

1. Technical Field of the Invention

The present invention relates to a position detector, and more particularly to a position detector using a magnetic scale member.

2. Description of the Related Art

A magnetic scale sensing apparatus using a position detector (magnetic scale), which includes a magnetic sensor using a magnetoresistance (MR) element or the like and a scale member which is magnetically patterned, has been known as an origin detection device of a magnetic encoder.

To determine the position of the magnetic sensor, the magnetic scale sensing apparatus needs to detect the position of an origin of the scale. In one known origin detection method, a magnetic mark for origin detection is provided in a channel different from that of the scale member, and the origin is determined by detecting the magnetic mark (for example, see Patent Document 1). In the conventional method of detecting the origin point, a magnetic mark for origin point detection is provided on a separate channel, hence a magnetic sensor for detecting the origin point must be provided separately from another magnetic sensor for scaling.

The magnetic scale sensing is applied, for example, to a slide control used for setting parameters corresponding to filter characteristics or frequency characteristics of input and output signals, or parameters for adjusting input and output levels in a mixing console (for example, see Patent Document 2).

When the magnetic scale sensing is applied to a slide control, for example, a magnetic sensor is mounted on a moving block and a magnetic pattern is detected as the moving block is moved in a movement guide carrying a magnetic scale member having the magnetic pattern. The position of the moving block, the amount of movement, and the direction of movement thereof are determined based on the detection of the magnetic pattern, and parameters are set based on the determination.

The magnetic scale sensing can achieve highly accurate detection while the position detector decreases in size. However, difficulties in managing the gap between the magnetic scale and the magnetic sensor are on the rise. The gap between the magnetic scale and the magnetic sensor that is mounted movable relative to the magnetic scale must decrease as the pitch (interval) between poles of the magnetic scale decreases.

[Patent Document 1] Japanese Examined Patent Application Publication No. 6-84893

[Patent Document 2] Japanese Patent Application Publication No. 2006-332074

[Patent Document 3] Japanese Utility Model Application Publication No. 6-53915

[Patent Document 4] Japanese Patent Application Publication No. 11-148842

[Patent Document 5] Japanese Patent Application Publication No. 2005-195367

[Patent Document 6] Japanese Patent Application Publication No. 2007-227055

In the conventional method of detecting the origin point, a magnetic mark for origin point detection is provided on a separate channel, hence a magnetic sensor for detecting the origin point must be provided separately from another magnetic sensor for scaling, thereby causing problems such as over-size of the position detector which causes enlargement of appliances using the position detector and increase of costs.

Generally, since the position detector is constructed such that the magnetic sensor moves relative to the magnetic scale, the position detector needs clearance (allowance) for movement. Slidability is degraded if the clearance is set to be as small as possible, whereas loss of sensing pulses or jouncing may occur if the clearance is set too large.

Therefore, it is necessary to set appropriate clearance when setting the magnetic scale and the magnetic sensor. However, the gap between the magnetic scale and the magnetic sensor opposing each other may be reduced below a critical level due to a variety of reasons such as uneven clearance within a slide range due to aging. In this case, it is difficult to obtain a resolution of signals having a logic value "0" or "1" when employing a method in which an origin, which is a Z phase representing the reference point of the magnetic scale, and A and B phases, which are signals that are 90 degrees out of phase and are produced by reading pitches magnetically recorded on the scale, are detected together. That is, the logic value may be erroneously kept at "1" or may be kept at "0."

Taking into consideration these circumstances, one can consider increasing the gap between the magnetic scale and the magnetic sensor and decreasing the magnetic intensity (magnetization) of the magnetic scale in order to perform appropriate sensing. However, these solutions are susceptible to external magnetic disturbance. In addition, the gap between the magnetic scale and the magnetic sensor needs to decrease as the accuracy of the position detector increases and the size thereof decreases as described above. Further, when the magnetic scale is weakly magnetized, the magnetic scale is very susceptible to disturbance such as magnetic fields produced by a magnet located near the magnetic scale, for example, the magnetic scale is easily demagnetized and the magnet of the magnetic scale is weakened or directed sideways due to disturbance. Accordingly, it is necessary to magnetize the magnetic scale in a full range (i.e., to magnetize the magnetic scale so as to maximize the area of a hysteresis loop of magnetization). Furthermore, if the gap between the magnetic scale and the magnetic sensor is simply set to be small and the magnetization of the magnetic scale is simply set to be large, then the magnetic sensor may oppose the magnetic scale with its magnetic sensitivity being within a saturation range and it is thus difficult to obtain sufficient signal resolution.

SUMMARY OF THE INVENTION

It is an object of the present invention to provide a position detector that can integrate the detection of the origin point and the detection of the direction and displacement with each other. Further, it is an object of the present invention to provide a position detector that can perform stable and appropriate sensing in case that the detection of the origin point and the detection of the direction and displacement are integrated in a common magnetic sensor.

In accordance with one aspect of the invention, a position detecting apparatus comprises: a magnetic scale part that has a magnetic pattern formed by magnetization along a given direction; an increased magnetization part with an increased intensity of magnetization as compared to the magnetic scale part, the increased magnetization part being arranged at an end portion of the magnetic scale part in the given direction; a magnetic detection part that detects both the magnetic field from the magnetic pattern of the magnetic scale part and the magnetic field from the increased magnetization part so as to output a magnetic detection signal, the magnetic detection part being arranged in opposed relation to the magnetic scale part movably in the given direction of the magnetic scale part; and a detection circuit that separates the magnetic detection signal fed from the magnetic detection part into a scale signal associated with the magnetic pattern and a non-scale signal associated with the increased magnetization part.

Preferably, the detection circuit comprises a first comparator into which the magnetic detection signal is inputted and a second comparator into which the magnetic detection signal is inputted, the first comparator having a first threshold level lower than a peak of the scale signal for outputting the scale signal, the second comparator having a second threshold level higher than the peak of the scale signal and lower than a peak of the non-scale signal for outputting the non-scale signal.

Preferably, the detection circuit generates an origin point signal indicating an origin point of the magnetic scale part based on the non-scale signal separated form the magnetic detection signal.

Preferably, the magnetic detection part comprises a magnetoresistance element.

Preferably, the position detecting apparatus comprises a magnetic field changing part that changes a distribution of the magnetic field of a magnetic flux generated from the magnetic pattern of the magnetic scale part.

Preferably, the magnetic field changing part changing a magnetic anisotropy of the magnetic scale part.

Preferably, the detection circuit comprises a digital circuit.

In accordance with one aspect of the invention, a position detecting apparatus comprises: a magnetic scale part that has a magnetic pattern formed by magnetization along a given direction; an increased magnetization part with an increased intensity of magnetization as compared to the magnetic scale part, the increased magnetization part being arranged at an end portion of the magnetic scale part in the given direction; a magnetic field shaping part disposed adjacent to the magnetic scale part for shaping a magnetic field generated from the magnetic scale part; and a magnetic detection part that detects both the magnetic field from the magnetic pattern of the magnetic scale part and the magnetic field from the increased magnetization part, the magnetic detection part being arranged in opposed relation to the magnetic scale part movably in the given direction of the magnetic scale part.

Preferably, the magnetic pattern and the increased magnetization part are arranged along a track through which the magnetic detection part moves.

Preferably, the increased magnetization part is positioned at the end portion of the magnetic scale part for enabling the magnetic detection part to output an origin point signal indicating an origin point of the magnetic scale part.

Preferably, the magnetic scale part has a pair of faces opposed to each other and extending along the given direction, the magnetic detection part is arranged on one of the opposed faces of the magnetic scale part for detecting the magnetic field from the magnetic pattern arranged on the one face of the magnetic scale part, and the magnetic field shaping part is disposed on the other of the opposed faces of the magnetic scale part for absorbing a magnetic flux generated from the magnetic pattern so as to shape the magnetic field to be detected by the magnetic detection part.

Preferably, the magnetic scale part has a pair of side faces opposed to each other and extending along the given direction, and a major face extending between the pair of side faces and being formed thereon with the magnetic pattern, and the magnetic field shaping part is disposed on either of the side faces of the magnetic scale part.

Preferably, the magnetic scale part comprises a permanent magnet.

Preferably, the magnetic scale part has a pair of side faces opposed to each other and extending along the given direction, and a major face extending between the pair of side faces and being formed thereon with the magnetic pattern, and the magnetic field shaping part comprises a permanent magnet member disposed on one of the side faces of the magnetic scale part and a magnetically permeable member disposed on the other of the side faces of the magnetic scale part.

Preferably, the magnetic scale part has a pair side faces opposed to each other and extending along the given direction, and a major face extending between the pair of side faces and being formed thereon with the magnetic pattern, and the magnetic field shaping part comprises a permanent magnet member disposed on one of the side faces of the magnetic scale part and another permanent magnet member disposed on the other of the side faces of the magnetic scale part.

Preferably, the position detecting apparatus further comprises a pipe member extending along the given direction, wherein the magnetic scale part is formed in the pipe member, and the magnetic field shaping part is formed in the pipe member in opposed relation to the magnetic scale part with respect to a center of the pipe member.

According to one aspect of the invention, it is not necessary to provide a separate track for the detection of the origin point, thereby reducing a width of the track by half as compared to the conventional device. Further, the magnetizing process of the scale part is necessary only once, and a separate magnetic sensor dedicated to the origin point detection is unnecessary.

Further, according to another aspect of the invention, there is provided a position detector which can perform stable and appropriate sensing where the detection of the origin point and the detection of the direction and displacement are integrated by a common magnetic sensor.

The invention features that the scale part is strongly magnetized to increase the magnetic field while the magnetic field shaping part is provided for shaping a spatial distribution of the magnetic field to thereby reduce a magnetic flux which enters into the magnetic detection part and forming an efficient guard field along sides of the magnetic scale part. First, by intensively magnetizing the scale part, it is possible to avoid reduction of the magnetic flux generated from the scale part, and to suppress influence from an external disturbing magnetic field. Second, the magnetic field shaping part is provided to shape the spatial distribution of the magnetic field so as to weaken the magnetic flux entered into the magnetic detection part. If the magnetic flux over the scale part is maintained intensive, the level of the magnetic flux entered into the magnetic detection part may exceed a magnetic saturation level of the magnetic detection part (magnetic sensor). Thus, the magnetic field shaping part is provided to change the magnetic flux emitted from the magnetic pattern. By such an arrangement, it is possible to reduce the magnetic flux entering into the magnetic detection part, thereby preventing magnetic saturation of the magnetic sensing. Third, the magnetic field shaping part creates an efficient guard field typically around side portion of the magnetic scale part. By such an arrangement, it is possible to suppress influence of an external disturbance magnetic field to thereby secure the stable magnetic sensing.

BRIEF DESCRIPTION OF THE DRAWINGS

FIG. 5 is a block diagram illustrating the configuration of a signal forming circuit according to the first embodiment of the invention.

FIG. 6 is a graph illustrating an analog detection signal from the magnetic detection unit input to the signal forming circuit and a scale signal and an origin forming signal output from the signal forming circuit.

FIGS. 7A to 7D are plan views illustrating modified examples of the first embodiment of the invention.

DETAILED DESCRIPTION OF THE INVENTION

Figure 1A:
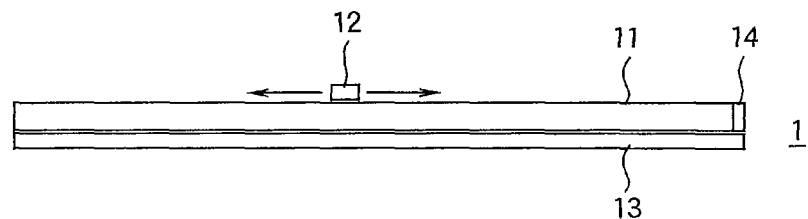
FIGS. 1A and 1B are schematic side views illustrating a basic configuration of a position detector (magnetic scale) according to a first embodiment of the invention.
Figure 1B:
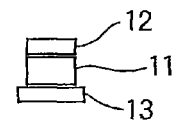

FIGS. 1A and 1B are schematic side views illustrating a basic configuration of a position detector (magnetic scale) 1 according to a first embodiment of the invention. Specifically, FIG. 1A is a longitudinal side view of the magnetic scale 1 and FIG. 1B is a transversal side view of the magnetic scale 1.

The magnetic scale 1 includes a magnetic scale member (magnetic scale part) 11, a magnetic sensor (magnetic detection part) 12, and a magnetic field shaping member (magnetic field shaping part) 13.

For example, the scale member 11 is a bar-shaped member formed of a permanent magnet such as a ferrite magnet including a metal compound or a rubber magnet formed by mixing ferrite magnetic powder, rubber material, etc. The scale member 11 may also be formed by filling a groove in a stainless bar (for example, having a radius of 4.0 to 8.0 mm) with a long and thin rubber magnetic filler (for example, having a radius of 1.5 to 5.0 mm) and then magnetizing the magnetic filler from a top 11a, using magnetizing means. The scale member 11 is polarized such that N and S poles are finely and alternately formed as magnetic patterns at regular intervals in a given longitudinal direction of the scale member 11. For example, the pitch P of N and S poles, which is referred to as a "magnetized scale pitch," is 0.1 mm to 2.0 mm. In addition, an increased magnetization part 14 for origin point detection is provided on one end portion of the scale member 11 in the same line (track) as the magnetized scale. For instance, the increased magnetization part is magnetized to or above a saturation level, while the magnetic pattern is magnetized to a moderate level which is 70% to 80% of the saturation level.

For example, the magnetic sensor 12 includes a plurality of magnetoresistance (MR) or giant magnetoresistance (GMR) elements. The magnetic sensor 12 detects, as voltage changes, changes in magnetic fields in a longitudinal direction of the scale member 11 or the presence or absence (or the magnetic strength) of a magnetic substance. The magnetic sensor 12 is mounted on the scale member 11 such that the magnetic sensor 12 is movable in a longitudinal direction of the scale member 11 and a sensing surface of the magnetic sensor 12 opposes the scale member 11 with a small clearance (gap) being set therebetween. The clearance is set, for example, in a range of 0.1 to 0.5 mm.

For example, the magnetic field shaping member (magnetic field shaping part) 13 is formed of a highly permeable material such as Fe or Fe—Ni metal. The magnetic field shaping member 13 is mounted under the scale member 11 in a longitudinal direction of the scale member 11 throughout the entire length of the scale member 11. Mounting the magnetic field shaping member 13 formed of a highly permeable material near the bottom surface of the scale member 11 in this manner reduces the strength of magnetic fields, output through the surface of the scale member 11 from magnetic poles that are formed on the scale member 11 through magnetization, and prevents magnetic saturation of the magnetic sensor 12, thereby reliably detecting the increased magnetization part 14 mounted on the end portion of the scale member 11.

The invention features that the magnetic scale member 11 is strongly magnetized to increase the magnetic field while the magnetic field shaping member 13 is provided for shaping a spatial distribution of the magnetic field to thereby reduce a part of the magnetic field (typically an area above the magnetic scale member) which enters into the magnetic detection part and to form an efficient guard field along sides of the magnetic scale member 11.

First, by intensively magnetizing the magnetic scale member 11, it is possible to avoid reduction of the magnetic field generated from the scale member 11. A weakly magnetized scale member 11 tends to demagnetize or to deflect a magnetic flux sideway in response to an external disturbance caused by approaching of a magnet for example, thereby suffering from the strong influence of the disturbing magnetic field. Therefore, it is desirable to raise the magnetizing level of the magnetic scale member 11 to strengthen the magnetic field.

Second, the magnetic field shaping member 13 is provided to shape the spatial distribution of the magnetic field so as to weaken a part of the magnetic field (typically an area over the magnetic scale member 11) entered into the magnetic detection member. If the magnetic field above the scale member 11 is maintained intensive, the level of the magnetic field entered into the magnetic sensor 12 may possibly exceed a magnetic saturation level of the magnetic sensor 12. Thus, the magnetic field shaping member 13 (magnetic material, magnet and/or iron plate) is provided to change a magnetic flux entering into the magnetic sensor 12. By such an arrangement, it is possible to reduce the magnetic field entering into the magnetic sensor 12, thereby preventing magnetic saturation of the magnetic sensing.

Third, the magnetic field shaping member 13 creates an efficient guard field typically around side portions of the magnetic scale member 11. By such an arrangement, it is possible to suppress influence of an external disturbance magnetic field to thereby secure the stable magnetic sensing.

In the magnetic scale 1 constructed as described above, as the magnetic sensor 12 is moved in a longitudinal direction of the scale member 11, the magnetic sensor 12 outputs pulse (scale) signals corresponding to reversals of the magnetic polarity of the scale member 11 between N and S poles. A controller (not shown) can detect the amount of movement of the magnetic sensor 12 by counting the scale signals output from the magnetic sensor 12. As described below, the magnetic sensor 12 has two magnetic detection units 121 and 122 arranged so as to be ½π out of phase with each other and the direction of movement of the magnetic sensor 12 can be determined based on the forward or backward direction corresponding to the phase difference between scale signals output from the two magnetic detection units 121 and 122. As the magnetic sensor 12 detects the magnetic field shaping member 13, the magnetic sensor 12 outputs an origin forming signal which is a cause of an origin signal and which may also be used directly as the origin signal. The position of the magnetic sensor 12 on the scale member 11 is detected based on the amount of movement, the moving direction, and the origin signal detected as described above.

Figure 2:
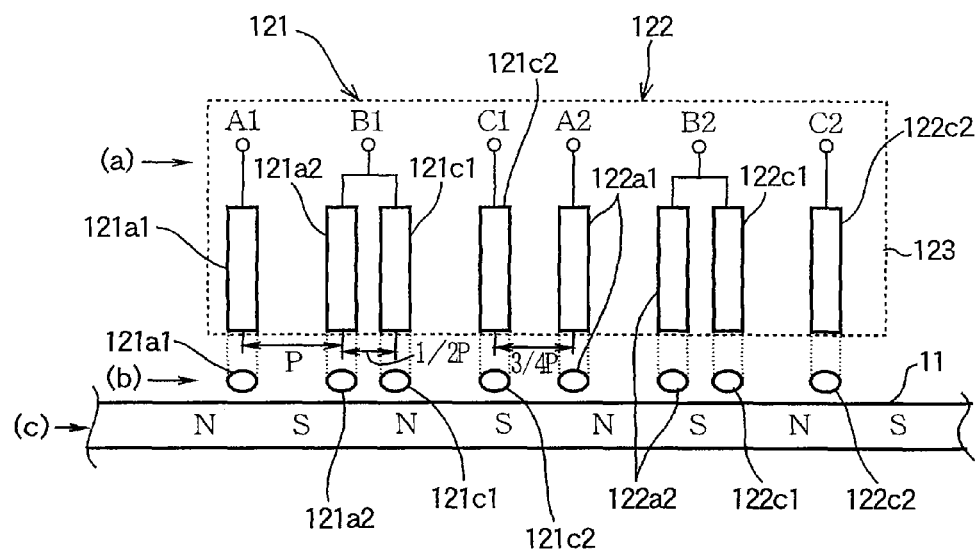
FIG. 2 is a schematic view illustrating the configuration of a main part of a magnetic sensor and positional relations between the magnetic sensor and the main part according to the first embodiment of the invention.
Figure 3A:
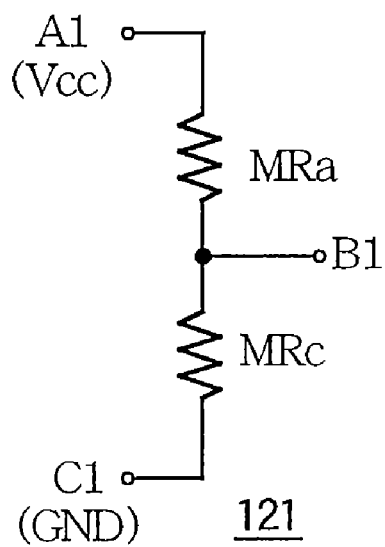
FIGS. 3A and 3B are equivalent circuit diagrams of magnetic detection units included in the magnetic sensor.
Figure 3B:
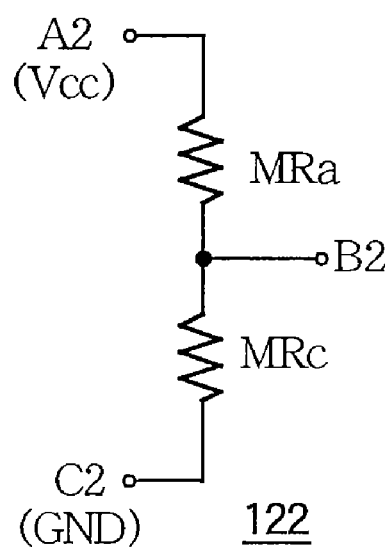
Figure 4:
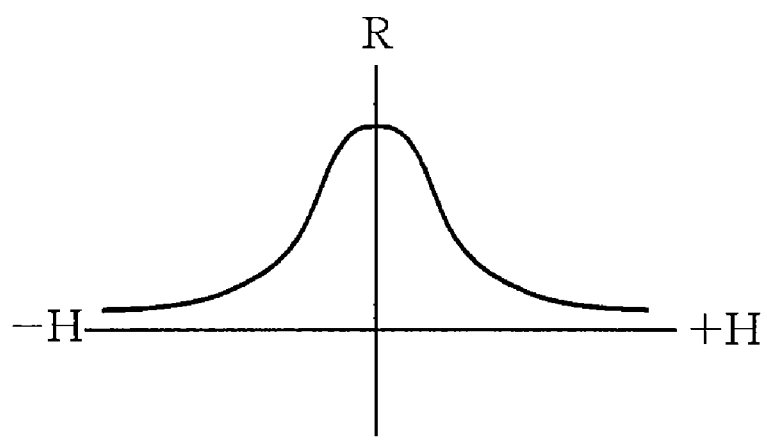
FIG. 4 is a graph illustrating characteristics of each MR element included in the magnetic detection units.

FIG. 2 is a schematic view illustrating the configuration of a main part 123 of the magnetic sensor 12 and positional relations between the magnetic sensor 12 and the main part 123 according to the first embodiment of the invention. The main part 123 includes 8 MR elements and the dimension from a left element 121a1 to a right element 121a2 is, for example, about 3 mm. FIGS. 3A and 3B are equivalent circuit diagrams of magnetic detection units 121 and 122 included in the magnetic sensor 12. FIG. 4 is a graph illustrating characteristics of each of the MR elements 123 included in the magnetic detection units 121 and 122.

The magnetic sensor 12 includes two magnetic detection units 121 and 122. The magnetic detection unit 121 includes magnetic detection elements 121a1, 121a2, 121c1, and 121c2, each including an MR element. The magnetic detection elements 121a1 to 121c2 and the scale member 11 are arranged as shown in parts (b) and (c) in FIG. 2. More specifically, the magnetic detection elements 121a to 121c2 are arranged opposite an arrangement of magnetic poles N, S, N, S, . . . at regular intervals on the scale member 11 such that each of the elements 121a to 121c2 crosses the longitudinal direction of the scale member 11 at right angles. In the part (a) in FIG. 2, the magnetic detection unit 121 is shown in plan view taken from the top for ease of explanation of the configurations of the magnetic detection elements 121a1 to 121c2. The magnetic detection elements 121a1 and 121a2 constitute a resistor MRa in the equivalent circuit diagram of the magnetic detection unit 121 and the magnetic detection elements 121c1 and 121c2 constitute a resistor MRc in the equivalent circuit diagram of the magnetic detection unit 121. A resistance a1 of the magnetic detection element 121a1 and a resistance a2 of the magnetic detection element 121a2 are related such that a1=a2 and a resistance c1 of the magnetic detection element 121c1 and a resistance c2 of the magnetic detection element 121c2 are related such that c1=c2. The sum of the combined resistance MRa of the magnetic detection elements 121a1 and 121a2 and the combined resistance MRc of the magnetic detection elements 121c1 and 121c2 is always constant.

As shown in FIGS. 3A and 3B, the resistors MRa and MRc are connected in series between a power source Vcc (A1) and a ground GND (C1) to constitute a half bridge circuit. Through a center-point voltage B1 of this half bridge circuit, the magnetic detection unit 121 outputs an analog signal according to movement of the magnetic sensor 12 on the scale member 11.

The magnetic detection elements 121a1 to 121c2 are arranged such that the longitudinal direction of the magnetic detection surfaces of the magnetic detection elements 121a1 to 121c2 are perpendicular to the longitudinal direction of the scale member 11. When "P" is the magnetized scale pitch of N and S poles of the scale member 11, the magnetic detection elements 121a1 and 121a2 are arranged at the same pitch "P," the magnetic detection elements 121a2 and 121c1 are arranged at a pitch of "P," and the magnetic detection elements 121c1 and 121c2 are arranged at the same pitch "P."

The absolute value of the strength H of a magnetic field in a longitudinal direction of the scale member 11 is maximized between the magnetic poles and is minimized at each pole. As shown in FIG. 4, the resistance of the MR element is maximized when the absolute value of the strength H of the longitudinal magnetic field is minimized and is minimized when the absolute value of the strength H is maximized. Therefore, when the magnetic detection elements 121a1 and 121a2 are each located between N and S poles, the resistance of the resistor MRa is low, while the magnetic detection elements 121c1 and 121c2 are located at N and S poles so that the resistance of the resistor MRc is high. Accordingly, when the positional relations between the magnetic sensor 12 and the main part 123 are as shown in FIG. 2, an output B1 of the magnetic detection unit 121 is at a high level corresponding to a logic value of "1."

The magnetic detection unit 122 is constructed similar to the magnetic detection unit 121. Specifically, the magnetic detection unit 122 includes MR elements 122a1, 122a2, 122c1, and 122c2. The magnetic detection elements 121a1 to 121c2 are arranged opposite magnetic poles N, S, N, S, . . . that are arranged at regular intervals on the scale member 11 such that each of the elements 121a1 to 121c2 crosses the longitudinal direction of the scale member 11 at right angles. The magnetic detection units 121 and 122 are arranged opposite the scale member at a pitch of three quarters (i.e., P) of the pitch of N and S poles P. More specifically, when the positional relations between the magnetic sensor 12 and the main part 123 are as shown in FIG. 2, the resistance of a resistor MRa of the magnetic detection unit 122 is slightly higher than that of the magnetic detection unit 122 and the resistance of a resistor MRc of the magnetic detection unit 122 is slightly lower than that of the magnetic detection unit 122. Therefore, if the magnetic detection unit 122 is moved to the right by a quarter (i.e., P) of the pitch P, then an output B2 of the magnetic detection unit 122 drops to a low level corresponding to a logic value of "0." That is, the magnetic detection units 121 and 122 output A and B-phase signals that are out of phase with each other.

The direction and amount of movement of the magnetic sensor 12 is determined based on pulse counts of the A and B-phase outputs from the magnetic sensor 12 as described above.

FIG. 5 is a block diagram illustrating the configuration of a signal forming circuit 15 (magnetic detection circuit) according to the first embodiment of the invention. FIG. 6 is a graph illustrating an analog detection signal from the magnetic detection unit 121 input to the signal forming circuit 15 and a scale signal and an origin forming signal output from the signal forming circuit 15.

The signal forming circuit 15 includes an amplifier 151 for amplifying an analog output signal from the magnetic detection unit 121, a first comparator 152A, a second comparator 152B, and two types of comparison level output circuits 153A and 153B.

An analog detection signal shown by a bold line in FIG. 6 is input from the magnetic detection unit 121 to the amplifier 151. The amplifier 151 amplifies and inputs the analog signal to one input terminal of the comparator 152A and one input terminal of the comparator 152B. The comparator 152A compares the input analog signal with a comparison level A and outputs a digital signal (scale signal) A shown in FIG. 6. The comparator 152B compares the input analog signal with a comparison level B and outputs a digital signal (non-scale signal or origin forming signal) B shown in FIG. 6. The comparison level A is set as low as possible taking into consideration noise of the magnetic detection unit 121, thereby allowing the magnetic detection unit 121 to reliably detect the magnetized scale. The comparison level B is set such that it is equal to or higher than the maximum level of the analog signal generated by detecting the magnetized scale and is equal to or less than the detection level of the origin forming signal. Setting the comparison levels A and B in this manner makes it possible to reliably detect the increased magnetization part (origin) and the magnetized scale that are arranged on one track.

In FIG. 6, a dashed line represents an analog output signal from the magnetic detection unit 121 when the magnetic field shaping member 13 is not provided. When the magnetic field shaping member 13 is not provided, the strength of magnetic fields from the magnetized scale reaches the saturation range of the magnetic detection unit 121 and the signal generated by detecting the magnetized scale and the signal generated by detecting the increased magnetization part are equal in amplitude, thus failing to detect the origin. Therefore, this embodiment provides the magnetic field shaping member 13 so that the strength of a magnetic field from the scale member 11 is reduced below the saturation range of the magnetic detection unit 121, thereby obtaining the analog signal shown by a bold line in FIG. 6.

An analog signal W1, which has a waveform different from others as shown at the right side of FIG. 6, may be detected since it is difficult to accurately magnetize the end portion of the scale member 11 when the scale member 11 is magnetized. Accordingly, the signal of the end portion can be disregarded and therefore the increased magnetization part 14 from which the B signal is generated is not disposed at the end portion of the scale member 11 and is instead disposed at a position that is one to several graduations away from the end portion toward the center portion of the scale member 11.

As the magnetic scale 1 is constructed as described above according to the first embodiment of the invention, it is possible to obtain both the scale signal and the origin forming signal through one track and one sensor. It is also possible to increase the magnetization of the scale member 11 and to suppress demagnetization and the influence of disturbance magnetism or the like since the magnetic field shaping member 13 is mounted such that the strength of a magnetic field from the scale member 11 is set to be less than the saturation range of the magnetic detection unit 121.

FIGS. 7A to 7D are plan views illustrating modified examples of the first embodiment of the invention.

FIG. 7A is a plan view of the first modified example of the first embodiment of the invention. In this example, magnetic field shaping members 13a and 13b are arranged near both side surfaces (first and second side surfaces) of the scale member 11 to reduce the strength of magnetic fields, output through surfaces of the scale member 11 from magnetic poles that were formed on the scale member 11 through magnetization. In this example, the magnetic field shaping member 13a is formed of a highly permeable material such as Fe or Fe—Ni metal, similar to the first embodiment, and is mounted on the first side surface of the scale member 11 in a longitudinal direction of the scale member 11 throughout the entire length of the scale member 11. For example, the magnetic field shaping member 13b is formed of a permanent magnet and is mounted on the second side surface of the scale member 11 in a longitudinal direction of the scale member 11 throughout the entire length of the scale member 11. Here, the magnetic field shaping members 13a and 13b are mounted such that the top surfaces of the magnetic field shaping members 13a and 13b are at a distance D from the top surface of the scale member 11. The distance D is set such that the origin can be reliably detected taking into consideration the magnetized scale pitch, the magnetization width, the strength of the magnetic field, and the like. Reducing the distance D decreases the strength of magnetic fields from the scale member 11 and facilitates extraction of the origin forming signal. Reducing the distance D also limits disturbance effects of disturbance magnetic fields.

FIG. 7B is a plan view illustrating the second modified example of the first embodiment of the invention. In this example, a magnetic field shaping member 13b is arranged near one side surface of the scale member 11 to reduce the strength of magnetic fields output through surfaces of the scale member 11 from magnetic poles that were formed on the scale member 11 through magnetization. In this example, the magnetic field shaping member 13b is, for example, formed of a permanent magnet and is mounted on the second side surface of the scale member 11 in a longitudinal direction of the scale member 11 throughout the entire length of the scale member 11. In this example, the magnetic field shaping member 13b is also mounted such that the top surface of the magnetic field shaping member 13b is at a distance D from the top surface of the scale member 11.

FIG. 7C is a plan view illustrating the third modified example of the first embodiment of the invention. In this example, magnetic field shaping members 13b are arranged near both (first and second) side surfaces of the scale member 11 to reduce the strength of magnetic fields output through the surface of the scale member 11 from magnetic poles that were formed on the scale member 11 through magnetization. In this example, for example, the magnetic field shaping members 13b are each formed of a permanent magnet and are mounted, respectively, on the first and second side surfaces of the scale member 11 in a longitudinal direction of the scale member 11 throughout the entire length of the scale member 11. In this example, the magnetic field shaping members 13b are also mounted such that the top surfaces of the magnetic field shaping members 13b are at a distance D from the top surface of the scale member 11. The pair of the permanent magnets 13a and 13b sandwich the scale member 11 such that the same poles (S pole and S pole, or N pole and N pole) are opposed each other between the pair of permanent magnets 13a and 13b. However, the invention is not limited to the disclosed embodiment. The pair of the permanent magnets 13a and 13b may sandwich the scale member 11 such that the opposite poles (N pole and S pole) face each other between the pair of permanent magnets 13a and 13b.

FIG. 7D is a plan view illustrating the fourth modified example of the first embodiment of the invention. In this example, an external pipe 16 is, for example, formed using a magnetic field shaping member 13a made of a highly permeable material such as Fe or Fe—Ni metal. In addition, a groove is formed in a top surface of the external pipe 16 and a scale member 11 is embedded in the groove, thereby achieving the same effects as those of each of the above embodiments. In this example, a magnetic field shaping member 13b formed of a permanent magnet is mounted at the bottom of the external pipe 16 in a longitudinal direction of the scale member 11 throughout the entire length of the scale member 11.

The magnetic field shaping member 13b runs directly parallel to a longitudinal direction of the scale member 11 and is magnetized along a portion of the magnetic field shaping member 13b opposing the scale member 11.

Figure 8:
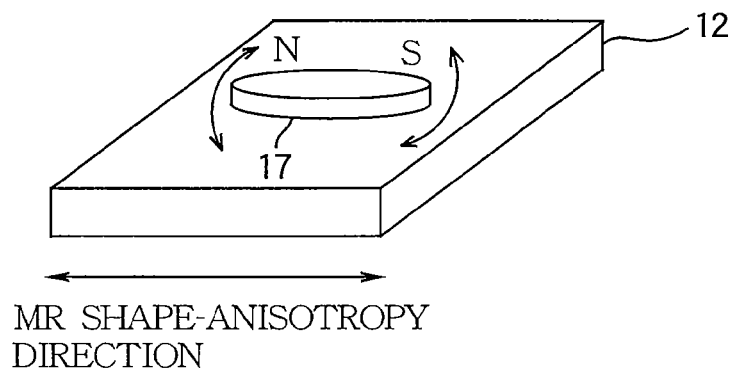
FIG. 8 is a perspective view schematically illustrating a bias magnetic field generator according to a second embodiment of the invention.

FIG. 8 is a perspective view schematically illustrating a bias magnetic field generator 17 (magnetic field changing part) according to a second embodiment of the invention. In this embodiment, the bias magnetic field generator 17 is added to the components of the first embodiment and the modified examples thereof described above. The components other than the bias magnetic field generator 17 are similar to those of the first embodiment and thus a description thereof is omitted herein.

The bias magnetic field generator 17 is, for example, formed of a rubber magnet or the like and is mounted on a rear surface of a magnetic sensor 12 (i.e., a main front surface of the magnetic sensor 12 opposite a magnetic detection surface thereof) such that the bias magnetic field generator 17 is rotatable parallel to the rear surface. By rotating the bias magnetic field generator 17, bias magnetic fields can be applied in a shape-anisotropy direction of the magnetic sensor 12 to achieve optimal adjustment (i.e., to a level at which the origin can be detected).

In this embodiment, it is also possible to omit the magnetic field shaping member 13 that is used in the first embodiment and the modified examples thereof described above.

Figure 9:
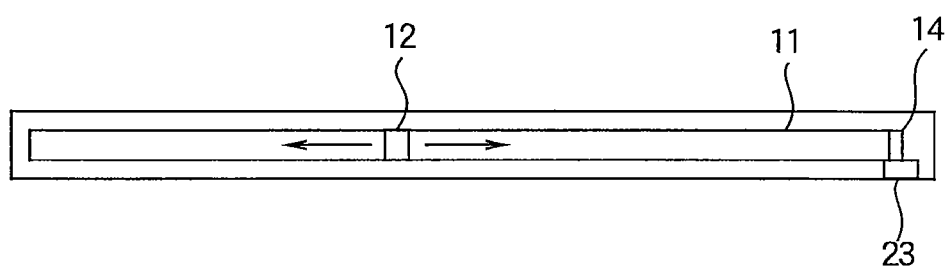
FIG. 9 is a schematic plan view illustrating a basic configuration of a position detector (magnetic scale) according to a third embodiment of the invention.

FIG. 9 is a schematic plan view illustrating a basic configuration of a position detector (magnetic scale) 2 according to a third embodiment of the invention.

This embodiment differs from the first embodiment in that a magnetic field shaping member 23 formed of a permanent magnet is disposed near an end portion of the scale member 11 instead of disposing the magnetic field shaping member 13 throughout the entire length of the scale member 11. Other aspects of the basic configuration of the magnetic scale are similar to those of the first embodiment and thus a description thereof is omitted herein.

Figure 10:
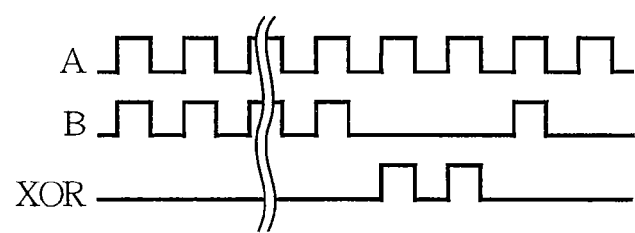
FIG. 10 is a timing chart illustrating detection of an origin signal according to the third embodiment of the invention.

In the position detector (magnetic scale) 2 according to the third embodiment, it is necessary to perform a process for extracting an origin forming signal since the magnetic field shaping member 23 is mounted only at the end portion of the scale member as described above. Therefore, a scale signal A and an origin forming signal B are XORed as shown in FIG. 10 and an XOR signal initially output when the magnetic sensor 12 is moved toward the end portion of the scale member is determined to be an origin. In this embodiment, the magnetic field shaping member 23 is disposed only near the end portion of the scale member 11 and therefore, at other locations, the strengths of magnetic fields from the scale member 11 are high so that it may not be possible to discriminate between a scale signal and an origin forming signal. However, in the vicinity of the end portion of the scale member 11, magnetic fields from the scale member 11 are weak due to influence of the magnetic field shaping member 23 and only a detection signal from an increased magnetization part 14 mounted on the end portion of the scale member 11 exceeds the comparison level B and therefore origin forming signals first disappear when approaching the end portion of the scale member 11 and an origin forming signal then reappears at the increased magnetization part 14.

As shown in a timing chart of FIG. 10, as the magnetic sensor 12 is moved toward the end portion of the scale member 11, origin forming signals disappear upon entering a specific section, and an origin forming signal B that is first detected after origin forming signals disappear can be determined to be a genuine origin forming signal, provided that a plurality of scale signals is present in the specific section where no origin forming signal is present. Processes in this case will be described below in a fourth embodiment of the invention. A right end portion of the signal A in FIG. 10 is disregarded since it corresponds to a right end portion of the analog signal in FIG. 6 and a right end portion of the signal A based on the analog signal in FIG. 6 while it represents an inaccurately magnetized portion of the end portion of the scale member 11.

Figure 11:
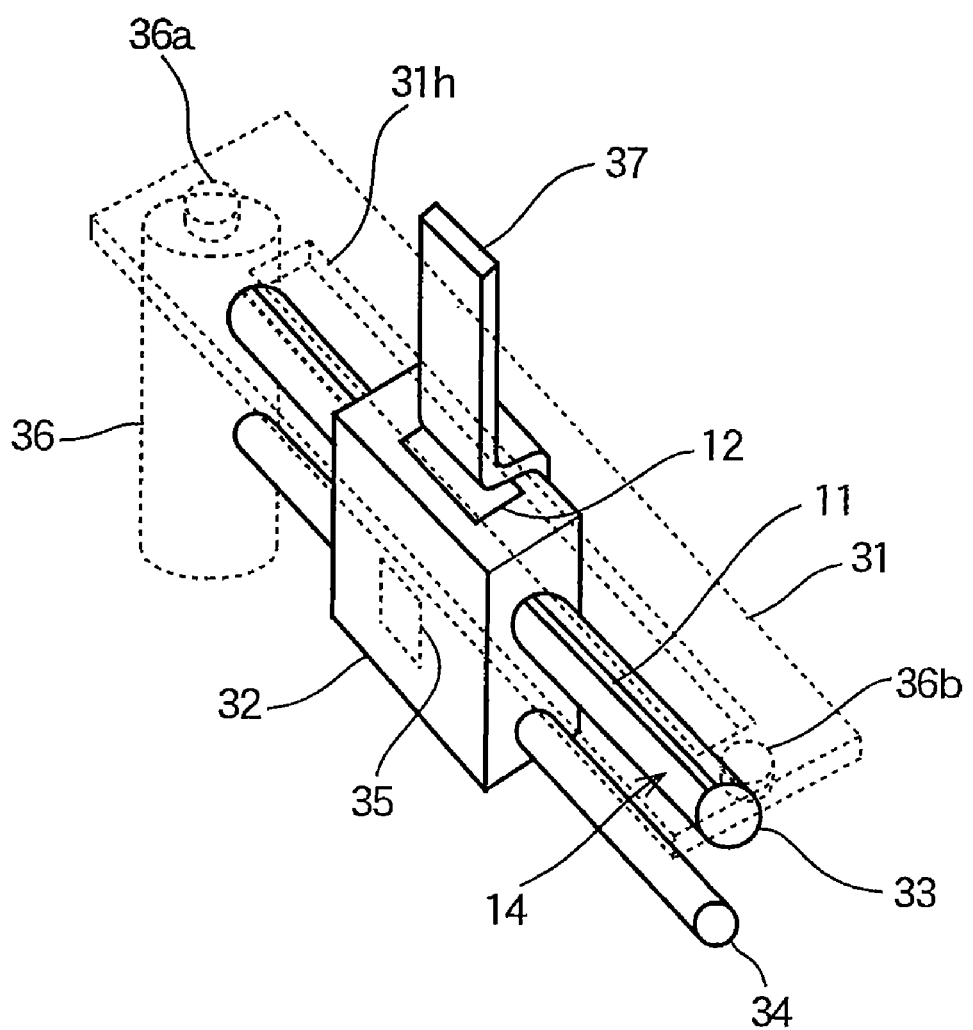
FIG. 11 is an exploded perspective view of a main part of a slide volume device according to a fourth embodiment of the invention.

FIG. 11 is an exploded perspective view of a main part of a slide volume device 3 according to the fourth embodiment of the invention. Components similar to those of the first to third embodiments are denoted by the same reference numerals and a description thereof is omitted herein.

For example, the slide volume device 3 is attached to a front panel of a mixer or the like and is used to control volume or the like.

The slide volume device 3 includes a frame 31 having an opening 31h, a moving object 32 attached to the frame 31 such that it is movable in a longitudinal direction of the opening 31h, movement guides 33 and 34, a motor 36, and drive pulleys 36a and 36b.

The moving object 32 is attached to the movement guides 33 and 34 such that it may be slid in a longitudinal direction of the opening 31h. For example, the movement guide 33 includes a pipe 16 and a magnetic scale member 11 mounted on a top surface of the pipe 16 as shown in FIG. 7D. The movement guide 33 may also be constructed by combining the magnetic scale member 11 and the magnetic field shaping member 13 in any of the first embodiment, the modified examples of the first embodiment, the second embodiment, and the third embodiment.

A motor 36 is attached to one side of the frame 31. The drive pulley 36a is attached to a drive shaft of the motor 36 and the driven pulley 36b is mounted on an end of the frame 31 opposite to the side of frame 31. A timing belt (not shown) is wound around the drive and driven pulleys 36a and 36b and the top of the moving object 32 is attached to a portion of the timing belt. Accordingly, the moving object 32 reciprocates in a longitudinal direction of the opening 31h as the motor 36 rotates in forward and reverse directions.

The moving object 32 includes a slide operator 37, a magnetic sensor 12, and a controller 35. One end of the slide operator 37 is attached to the moving object 32 and the other end thereof protrudes upward through the opening 31h. The magnetic sensor 12 is attached to the moving object 32 such that a magnetic detection surface of the magnetic sensor 12 faces downward, opposing the magnetic scale member 11. The controller 35 processes an analog output signal from the magnetic sensor 12 and outputs positional information of the slide operator 37.

As a user operates the slide operator 37, the moving object 32 moves backward and forward in a longitudinal direction of the opening 31h. As the moving object 32 moves backward and forward, the magnetic sensor 12 moves over the magnetic scale member 11 and outputs an analog detection signal according to the movement to the controller 35. The controller 35 processes the detection signal and outputs positional information of the slide operator 37.

When the slide volume device 3 is constructed so as to be manually operated, it can be constructed without the motor 36, the pulleys 36a and 36b, the belt, etc.

Figure 12:
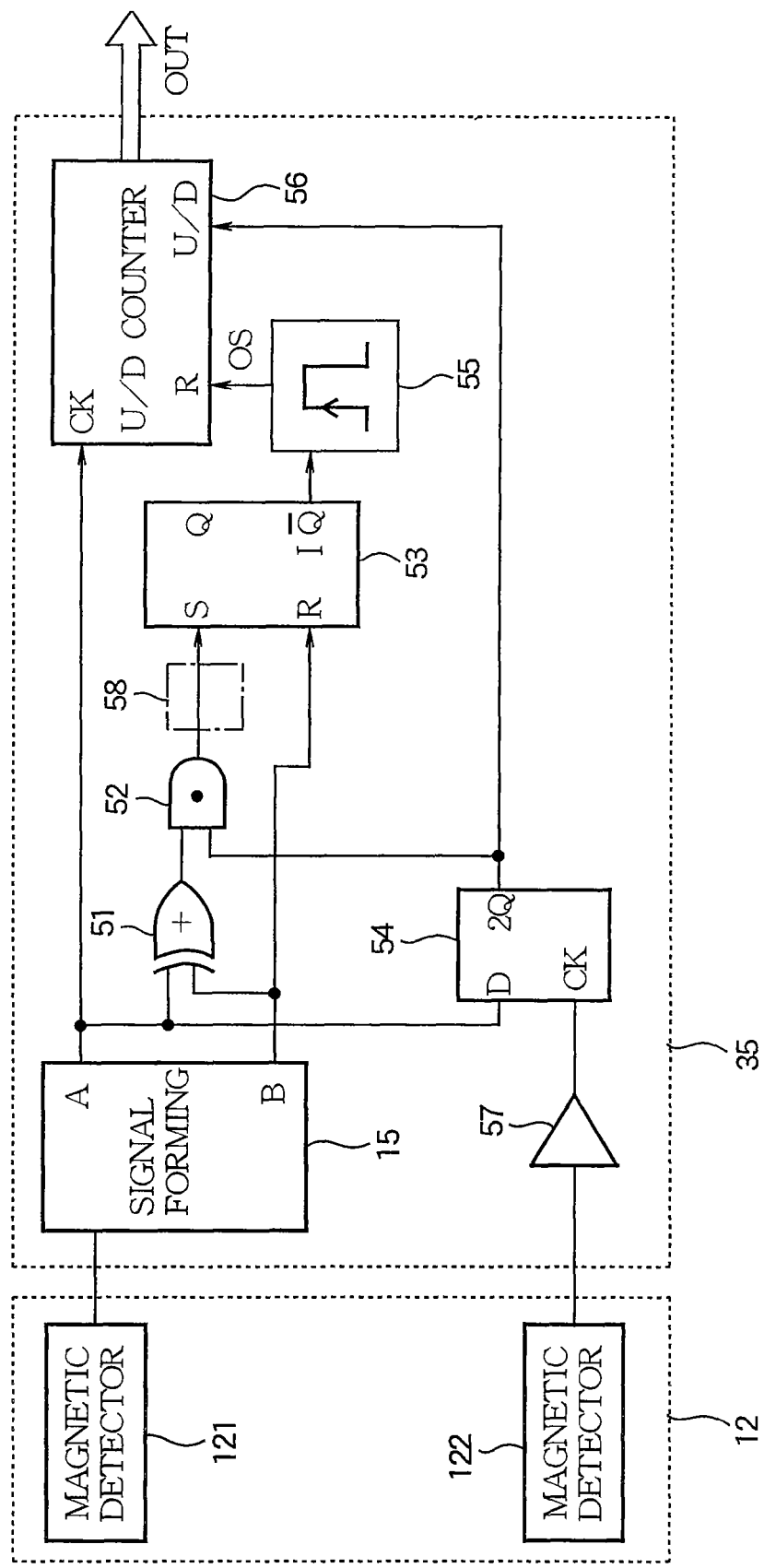
FIG. 12 is a block diagram illustrating functionality of a controller according to the fourth embodiment of the invention.
Figure 13:
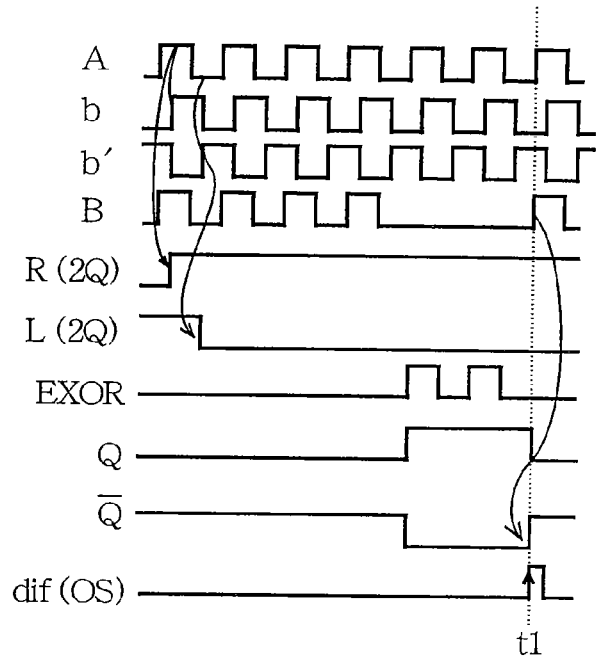
FIG. 13 is a timing chart illustrating signal processing of the controller according to the fourth embodiment of the invention.

FIG. 12 is a block diagram illustrating functionality of the controller 35 according to the fourth embodiment of the invention. FIG. 13 is a timing chart illustrating signal processing of the controller 35 according to the fourth embodiment of the invention. This example will be described with reference to the case where the position detector of the third embodiment is used as that of the fourth embodiment. Components similar to those of the first to third embodiments are denoted by the same reference numerals and a description thereof is omitted herein.

The controller 35 includes a signal forming circuit 15 as shown in FIG. 5, an XOR circuit 51, an AND circuit 52, an RS flip-flop circuit 53, a D flip-flop circuit (DFF) 54, a differential circuit (one-shot (OS) circuit) 55, an up/down counter 56, and a wave forming means 57 that is a combination of an amplifier and a wave forming circuit.

The magnetic detection unit 121 inputs an analog detection signal to the signal forming circuit 15 (see FIG. 5), which then outputs a scale signal A and an origin forming signal B. The scale signal A is input to a CK terminal of the up/down counter 56 and is also input to one input terminal of the XOR circuit 51 and a D terminal of the D flip-flop circuit 54. The origin forming signal B is input to the other input terminal of the XOR circuit 51 and an R terminal of the RS flip-flop circuit 53.

Figure 14:
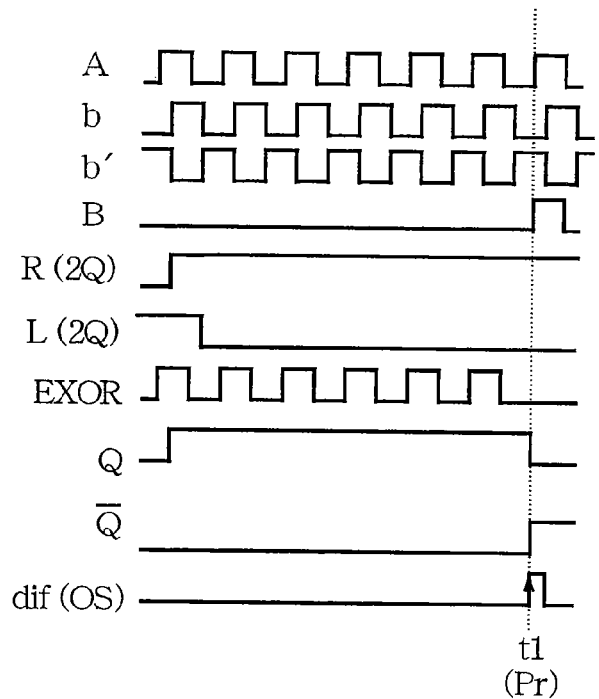
FIG. 14 is another timing chart illustrating signal processing of the controller according to the fourth embodiment of the invention.

The magnetic detection unit 122 inputs an analog detection signal to a clock input terminal (CK) of the D flip-flop circuit 54 through the wave forming means 57. Since the A-phase signal A (scale signal A) shown in FIG. 13 is input from the A terminal of the signal forming circuit 15 to the D input terminal of the DFF 54, the DFF 54 receives D input data "1" at a rising edge of the input clock (specifically, at a rising edge of a b signal as a B-phase signal or a B2 output signal of FIG. 3B or a waveform b' of FIG. 13) and produces an R(2Q) output as the 2Q output of the DFF 54. Here, "R(2Q)" represents a right (R)-directional signal produced from the 2Q terminal when the sensor 12 of FIG. 11, 1, or 7 is moved right. "L(2Q)" in FIG. 14 represents a left (L)-directional signal produced from the 2Q terminal when the sensor 12 is moved left. In FIGS. 13 and 14, a horizontal axis represents a time axis or positional information. An R-directional signal 2Q of "1" causes the up/down counter 56 to be incremented. Here, the AND circuit 52 receives and ANDs the 2Q signal "1" and the output of the XOR and outputs the ANDed signal to set the flip-flop circuit 53. Since the XOR output generates two (or more) pulses only when the sensor 12 reaches the right end, the Q output of the flip-flop circuit 53 rises to "1" and the /Q output ("/Q" represents the inverse of "Q") drops to "0" at the first pulse. The /Q output of the flip-flop circuit 53 rises to "1" at time "t1" when the B output (i.e., B signal) of the signal forming circuit 15 rises to "1." This /Q output signal is input to the differential circuit (one-shot (OS) circuit) 55, thereby resetting the counter 56. Zero adjustment of the detector 1 is performed by resetting the counter 56 in this manner.

If the moving object 32 (i.e., the sensor 12) is moved from a position Pr, which is shown at time "t1" in FIG. 14, to the left after reaching the right end, then the XOR output generates two pulses at the same positions as those of FIG. 13. However, in this case, the DFF 54 outputs "0" as the 2Q signal as shown in "L(2Q)" (at a corresponding time) in FIG. 14 and therefore the flip-flop circuit 53 is not set. Accordingly, the flip-flop circuit 53 is kept reset, the OS output is "0," and the counter 56 is not reset. That is, the up/down counter 56 is reset only when the moving object 32 reaches the right end while moving from left to right. Accordingly, the up/down counter 56 is reset only when the slide operator 37 reaches the origin while moving in a direction toward the origin. As shown, the reset (origin) signal is output at the same time "t" as when the origin forming signal rises.

The output OUT of the counter 56 is used as an accurate position of the moving object 32 (see FIG. 11) in a circuit or means used at a stage downstream of the counter 56. For example, the output OUT of the counter 56 is used as movement-control positional information in a fader device of a mixer or an electronic instrument for performing audio level or PAN control level setting, effects control, sound tone modulation control, or the like. For example, the output OUT of the counter 56 can also be used in other products such as printers.

In this embodiment, the XOR signal is used as a cause of the origin signal when the XOR signal has at least two pulses in order to achieve accurate detection, for example when a strong disturbance magnetic field has temporarily occurred due to reasons such as a strong magnet approaching the origin. When a strong disturbance magnetic field temporarily approaches, the magnetic field from the magnetic scale is disturbed and the B signal may not be detected (i.e., an XOR signal may be generated) even though the magnetic sensor 12 is not near the origin. To prevent this erroneous origin detection, the XOR signal, which is a cause of the origin signal, is used as an origin forming signal only when the XOR signal has at least two pulses, thereby achieving accurate detection.

In view of this, the following problem occurs. If a pseudo-origin signal (XOR output) is generated due to disturbance at an intermediate position other than the origin, solid-line components of the controller 35 in FIG. 12 perform an erroneous operation of determining that a position where the disturbance is removed is the origin (i.e., an operation for generating a B signal) when the magnetic sensor 12 is located at the position. To avoid this problem, a retriggerable counter 58 may be additionally provided between the AND circuit 52 and the flip-flop circuit 53 as shown by a long and short dashed line.

While the counter 58 is incremented upon receiving an output from the AND circuit 52, the counter 58 is constructed such that it has a function to return the count value to zero if it is not incremented within a predetermined time (for example, 0.1 seconds) and that it outputs "1" to set the flip-flop circuit 53 only when the counter value has reached, for example, 2 or more.

Adding the supplementary means (i.e., the counter 58) constructed as described above, which is shown by a long and short dashed line in FIG. 12, has an advantage in that it blocks disturbance (i.e., removes the influence of disturbance) that has additionally occurred even though the magnetic field shaping part 13 functions as a magnetic-related malfunction prevention means (i.e., a means for making magnetic-related malfunctions hard). In this case, to reset the detector according to the embodiments of the invention using the origin signal, it is necessary for the detector to quickly perform the operation of contacting the end portion taking into consideration the above conditions. The reason is as follows. If the detector slowly performs the operation of contacting the end portion, the output of the counter 58 overflows preventing the RS flip-flop circuit 53 from being reset after being set, thus failing to reset the counter 56.

Although this example has been described with reference to the case where the position detector of the third embodiment is used as that of the fourth embodiment, the position detector of any of the first embodiment, the modified examples thereof, and the second embodiment can be used as that of the fourth embodiment. In this case, it is possible to consequently output a reset signal (origin signal) at the time "t1" (corresponding to the position of the right end position) when the origin forming signal is detected although the timing chart is identical to that of FIG. 14. In addition, when the position detector of any of the first embodiment, the modified examples thereof, and the second embodiment is used as that of any of the fourth embodiment, the XOR circuit 51, the AND circuit 52, and the RS flip-flop circuit 53 of the controller 35 may be omitted while the origin forming signal B may be input directly to the differential circuit (one-shot (OS) circuit) 55.

Although not illustrated in FIGS. 13 and 14, a right end portion of the signal A in each of FIGS. 13 and 14 is disregarded, similar to that of FIG. 10, since it corresponds to a right end portion of the analog signal in FIG. 6 and a right end portion of the signal A based on the analog signal in FIG. 6 while it represents an inaccurately magnetized portion of the end portion of the scale member 11.

According to the embodiments of the invention described above, the configuration of the position detector is significantly simplified since the scale magnetic pattern for the scale signal detection and the increased magnetization part for the origin signal detection are disposed in the same line (the same track). This line is continuously arranged along the track, and this line may be curbed or straight along the track of the magnetic sensor. Employing this configuration eliminates the need to separately provide a magnetic sensor for scale signal detection and a magnetic sensor for origin signal detection and the need to align the two different sensors, thereby increasing accuracy.

In addition, according to the embodiments of the invention, the magnetic field shaping member is mounted near the scale member so that it is possible to reduce the strength of magnetic fields, output through surfaces of the scale member from magnetic poles that were formed on the scale member through magnetization, and thus to prevent magnetic saturation of the magnetic sensor. Accordingly, the increased magnetization part mounted on the end portion of the scale member can be discriminated from the scale magnetic pattern for scale signal detection, thereby achieving reliable detection.

Further, since the strength of magnetic fields output through surfaces of the scale member from magnetic poles that were formed on the scale member through magnetization can be reduced as the magnetic field shaping member is mounted near the scale member as described above, it is possible to maximize the magnetization of the magnetic scale member, thereby achieving stable scale sensing.

Although the above embodiments of the invention have been described only with reference to examples where the position detector according to each embodiment is applied to a slide volume device, the position detector according to each embodiment can also be applied to a position detection sensor of a printer, a car suspension, or the like.

In addition, although the above embodiments of the invention have been described only with reference to a linear scale, each embodiment of the invention can also be applied to a rotary encoder or the like.

Although the present invention has been described with reference to the above embodiments, the invention is not limited to the above embodiments. Those skilled in the art will appreciate that various modifications, improvements, and combinations are possible, without departing from the scope and spirit of the invention as disclosed in the accompanying claims.

What is claimed is:

1. A position detecting apparatus comprising:
    a magnetic scale part that has a magnetic pattern formed by magnetization along a given direction;
    an increased magnetization part with an increased intensity of magnetization as compared to the magnetic scale part, the increased magnetization part being arranged at an end portion of the magnetic scale part in the given direction;
    a magnetic field shaping part disposed adjacent to the magnetic scale part for shaping a magnetic field generated from the magnetic scale part; and
    a magnetic detection part that detects both the magnetic field from the magnetic pattern of the magnetic scale part and the magnetic field from the increased magnetization part, the magnetic detection part being arranged in opposed relation to the magnetic scale part movably in the given direction of the magnetic scale part.

2. The position detecting apparatus according to claim 1, wherein the magnetic pattern and the increased magnetization part are arranged along a track through which the magnetic detection part moves.

3. The position detecting apparatus according to claim 1, wherein the increased magnetization part is positioned at the end portion of the magnetic scale part for enabling the magnetic detection part to output an origin point signal indicating an origin point of the magnetic scale part.

4. The position detecting apparatus according to claim 1,
    wherein the magnetic scale part has a pair of faces opposed to each other and extending along the given direction,
    wherein the magnetic detection part is arranged on one of the opposed faces of the magnetic scale part for detecting the magnetic field from the magnetic pattern arranged on the one face of the magnetic scale part, and
    wherein the magnetic field shaping part is disposed on the other of the opposed faces of the magnetic scale part for absorbing a magnetic flux generated from the magnetic pattern so as to shape the magnetic field to be detected by the magnetic detection part.

5. The position detecting apparatus according to claim 1,
    wherein the magnetic scale part has a pair side faces opposed to each other and extending along the given direction, and a major face extending between the pair of side faces and being formed thereon with the magnetic pattern, and
    wherein the magnetic field shaping part is disposed on either of the side faces of the magnetic scale part.

6. The position detecting apparatus according to claim 1, wherein the magnetic scale part comprises a permanent magnet.

7. The position detecting apparatus according to claim 1,
    wherein the magnetic scale part has a pair of side faces opposed to each other and extending along the given direction, and a major face extending between the pair of side faces and being formed thereon with the magnetic pattern, and
    wherein the magnetic field shaping part comprises a permanent magnet member disposed on one of the side faces of the magnetic scale part and a magnetically permeable member disposed on the other of the side faces of the magnetic scale part.

8. The position detecting apparatus according to claim 1,
    wherein the magnetic scale part has a pair of side faces opposed to each other and extending along the given direction, and a major face extending between the pair of side faces and being formed thereon with the magnetic pattern, and
    wherein the magnetic field shaping part comprises a permanent magnet member disposed on one of the side faces of the magnetic scale part and another permanent magnet member disposed on the other of the side faces of the magnetic scale part.

9. The position detecting apparatus according to claim 1, further comprising a pipe member extending along the given direction, wherein the magnetic scale part is formed in the pipe member, and the magnetic field shaping part is formed in the pipe member in opposed relation to the magnetic scale part with respect to a center of the pipe member.

10. The position detecting apparatus according to claim 1, wherein the magnetic detection part comprises a magnetoresistance element.

11. The position detecting apparatus according to claim 1, further comprising a magnetic field changing part that changes a distribution of the magnetic field of a magnetic flux generated from the magnetic pattern of the magnetic scale part.

12. The position detecting apparatus according to claim 11, wherein the magnetic field changing part changing a magnetic anisotropy of the magnetic scale part.

* * * * *